United States Patent [19]

Inoue

[11] Patent Number: 5,665,021
[45] Date of Patent: Sep. 9, 1997

[54] TOROIDAL CONTINUOUS VARIABLE TRANSMISSION

[75] Inventor: Eiji Inoue, Sagamihara, Japan

[73] Assignee: Isuzu Motors Limited, Tokyo, Japan

[21] Appl. No.: 624,680

[22] Filed: Apr. 19, 1996

[30] Foreign Application Priority Data

Apr. 28, 1995 [JP] Japan .................. 7-127418

[51] Int. Cl.$^6$ .................. B60K 41/14; F16H 15/38
[52] U.S. Cl. .................. 476/4; 476/42; 477/37; 477/43; 477/904
[58] Field of Search .................. 476/4, 42; 477/37, 477/43, 904

[56] References Cited

U.S. PATENT DOCUMENTS 4,107,776  8/1978  Beale .................. 477/43 X

FOREIGN PATENT DOCUMENTS 5-332426  12/1993  Japan .

*Primary Examiner*—Allan D. Herrmann
*Attorney, Agent, or Firm*—Browdy and Neimark

[57] ABSTRACT

The toroidal continuous variable transmission limits the amount of change of the target transmission ratio while at the same time taking advantage of the excellent speed change responsiveness to perform acceleration and deceleration of a vehicle in a way the driver expects. The toroidal continuous variable transmission checks if the difference $\Delta e$ between the present target transmission ratio and the previous target transmission ratio, which were calculated based on car speed information, is larger than the predetermined maximum value $\Delta e_{max}$. When the absolute value of $\Delta e$ is greater than the maximum value, a target transmission ratio $e_{cn}$ limited by the maximum value is determined. For this corrected target transmission ratio, a control signal Ve is calculated according to the map stored beforehand in the controller. According to the control signal Ve, the tilt angles of the power rollers in the toroidal speed change unit are changed. This control procedure reduces the amount of change of the target transmission ratio compared with the one when the uncorrected target transmission ratio is adopted, thereby preventing unstable response of the speed change control.

1 Claim, 5 Drawing Sheets

TOROIDAL CONTINUOUS VARIABLE TRANSMISSION

BACKGROUND OF THE INVENTION

1. Field of the Invention

The present invention relates to a toroidal continuous variable transmission for vehicles, which continuously changes the rotation speed of an input disk according to a tilt angle of power rollers with respect to the input disk and output disk arranged opposite each other and transmits the changed rotation speed to the output disk.

2. Description of the Prior Art

The toroidal continuous variable transmission generally has a toroidal speed change unit that comprises an input disk, an output disk and power rollers arranged between these disks and which transmits the rotational power of the input disk driven by the input shaft to the output disk through the power rollers and then to the output shaft.

Japan Patent Laid-Open No. 332426/1993 discloses a continuous variable transmission, which eliminates speed-change shocks to a driver and reduces engine noise without degrading the acceleration responsiveness. This continuous variable transmission includes a reference value setting means for setting a control reference value according to a control map; a decision means which has a speed change drive unit to change a transmission ratio according to a target transmission value set by the reference value setting means and which determines whether a sharp acceleration is demanded or not according to the amount of depression of an accelerator pedal; and a sharp acceleration control means which, when the decision means determined that the sharp acceleration is demanded, changes the transmission ratio progressively to increase the vehicle speed while performing a recursive operation of slowly increasing and sharply decreasing the engine revolution.

The torque of an engine 1 is generally transmitted, as shown in FIG. 3, to an input disk 10 of a toroidal continuous variable transmission 5 through a lockup clutch 34, a torque converter 2, a turbine shaft 3 and a loading cam 4. The toroidal continuous variable transmission 5 has two toroidal speed change units 7, 8 mounted on an input shaft 6. The toroidal speed change units 7, 8 each comprise an input disk 10, 20, an output disk 11, 21 arranged opposite the input disk 10, 20, tilt-rotatable power rollers 12, 22 for transmitting the torque from the input disk 10, 20 to the output disk 11, 21, and an actuator (reference number 42 in FIG. 4) to change the tilt angle of the power rollers 12, 22. The toroidal continuous variable transmission 5 has these two toroidal speed change units 7, 8 arranged opposite each other on the input shaft 6 and is called a double cavity type.

The input disk 10 and 20 are mounted on the input shaft 6. The turbine shaft 3 is drivably connected to the input shaft 6 through the loading cam 4 arranged at the back of the input disks 10, 20. The riding of the loading cam 4 caused by the relative rotation between the input disks 10, 20 and the turbine shaft 3 produces a pressing force in proportion to the torque of the turbine shaft 3. When the pressing force is generated, the input shaft 6 and the input disks 10, 20 can turn together with the turbine shaft 3. The input shaft 6 is supported so that it can be slightly moved axially with respect to a casing (not shown) and rotated together with the input disks 10, 20. The input disks 10, 20 and the input the shaft 6 receive the engine torque via the lockup clutch 34, torque converter 2 and turbine shaft 3. The output disks 11, 21 are arranged opposite the input disks 10, 20 and supported rotatable on the input shaft 6.

The power rollers 12, 22 are arranged between the input disks 10, 20 and the output disks 11, 21 and in frictional engagement with the toroidal surfaces of the paired input and output disks 10, 11 and with the toroidal surfaces of the paired input and output disks 20, 21, respectively. The power rollers 12, 22 are rotatable on their own spin axes 13, 23 and can be tilted about tilt axes 14, 24 perpendicular to the spin axes 13, 23 by an actuator (reference number 42 in FIG. 4) driven by external hydraulic operation. The output disks 11, 21 are interconnected by a hollow shaft 30, which has an output gear 31 secured thereto. The output gear 31 is in mesh with a gear 32 of the output shaft 33. Between the output disks 11 21 and the output shaft 33, a differential mechanism (not shown) of a bevel gear type or a planetary gear type may be provided to absorb a difference in transmission ratio that develops between the toroidal speed change units 7, 8.

The toroidal continuous variable transmission 5 has a link mechanism that synchronizes the power rollers 12, 22 with each other so that the tilt angles of the power rollers 12, 22 agree. As the tilt angles of the power rollers 12, 22 change, the frictional engagement points between the power rollers 12, 22 and the input disks 10, 20 and output disk 11, 21 shift, thus continuously changing the rotation speed. Transfer of the rotating power from the input disk 10, 20 to the output disks 11, 21 through the power rollers 12, 22 is by a shear force of oil under high pressure, i.e., traction force (viscous frictional force). To produce a specified traction force requires a very large pressing force at the contact points between the power rollers 12, 22 and the input and output disks. The pressing force is produced by the loading cam 4 pushing the input disk 10 toward the output disk 11 and then pushing the input disk 20 to the output disk 21 by the reaction of the first pushing when only one loading cam 4 is used or, when another loading cam 4 is provided, by the action of the second loading cam 4.

The toroidal continuous variable transmission 5 operates as follows. When the torque of the engine 1 is supplied to the turbine shaft 3, the torque is conveyed through the loading cam 4 to the input disk 10, from which it is further transferred to the input disk 20 through the input shaft 6. Upon receiving the torque, the input disk 10 rotates causing the power rollers 12 to rotate about their spin axes 13. The rotation of the power rollers 12 is transferred to the output disk 11. The torque transmitted to the input disk 20 is transferred to the output disk 21 through the power rollers 22 that rotate on their spin axes 23. During this power transmission, the power rollers 12, 22 are synchronized and tilted through the same angle about the tilt axes 14, 24, which are at the centers of arcs that form the toroidal surfaces of the input and output disks 10, 11 and 20, 21. This causes the frictional engagement points between the power rollers 12, 22 and the input disks 10, 20 and output disks 11, 21 to shift. That is, the rotation radius ratio of the contact points between the input and output disks 10, 11 and 20, 21 and the power rollers 12, 22 change, thus allowing the toroidal continuous variable transmission 5 to continuously change the speed. The rotation of the output disks 11, 21 is transferred to the output shaft 33 through the hollow shaft 30, output gear 31 and gear 32.

In the toroidal continuous variable transmission, as shown in FIG. 4, a controller 40 that plays a central role in the speed change control apparatus receives detection signals related to the velocity of the vehicle, such as car speed, engine revolution and accelerator opening detected by a car speed sensor 44, an engine revolution sensor 45 and an accelerator opening sensor 43, respectively. According to these detected values, the controller 40 determines a target transmission ratio based on a map stored in it, and sends a transmission ratio to a transmission ratio control actuator 42 that causes the actual transmission ratio to match the target transmission ratio. The transmission ratio control actuator 42, upon receiving a command signal calling for a change in the transmission ratio, controls the hydraulically driven mechanism to pivot the power rollers 12, 22 about the tilt axes 14, 24 to increase or decrease the tilt angle, thereby performing the transmission ratio control.

The control performed by the toroidal continuous variable transmission is explained by referring to FIG. 5 and FIG. 6. First, after the transmission ratio control routine is started (step 70), the controller 40 receives information associated with the velocity of the car, such as car speed, engine revolution and accelerator opening, and calculates a target transmission ratio $i_n$ (step 71). Next, the controller 40 calculates the difference $\Delta i$ ($=i_n-i_{n-1}$) between the current target transmission ratio $i_n$ and the previously calculated target transmission ratio $i_{n-1}$ (step 72) (see FIG. 6). For the calculated target transmission ratio $i_n$ the controller 40 calculates a control signal Ve according to the map stored in it (step 73). The calculated control signal Ve is output to the transmission ratio control actuator (step 74). The transmission ratio control actuator changes the tilt angle of the power rollers 12, 22 of the toroidal speed change units 7, 8 according to the control signal to make the actual transmission ratio equal the target transmission ratio. Next, the control of the controller 40 is returned to the main routine (step 75).

The above toroidal continuous variable transmission, however, has the following problems. The toroidal continuous variable transmission generally has a characteristic of high speed change operation. If the correspondence map between the detected signals and the target transmission ratios stored in the controller is set such that the amount of change $\Delta i$ in the target transmission ratio is large for a change in the accelerator opening, as shown in a dashed line 80, the time $T_2$ it takes for the actual transmission ratio to reach the final target transmission ratio becomes short, as illustrated by the curve 81. But the driver will feel a mismatch between what has happened and what he or she has expected in terms of the change in the car speed as related to the accelerator pedal operation.

In the case of a kickdown operation in which the operator depresses the accelerator pedal greatly to demand quick acceleration (time $T_0$ to $T_2$), what the driver normally expects is that, with the transmission ratio set compatible to a relatively low speed (it has a low value when it is taken as a ratio of the wheel revolution to the engine revolution), a large depression of the accelerator pedal causes the engine revolution to rise sharply and the car speed to increase progressively, after which the transmission ratio shifts to the one compatible to relatively high speed.

However, because of the characteristic of the toroidal continuous variable transmission that the speed shift is quickly accomplished and because of the setting such that the amount of change in the target transmission ratio is large for a change in the accelerator opening, the large depression of accelerator pedal causes the rotation radius ratio of the actual contact points in the toroidal speed change unit to swiftly move toward the target transmission ratio set for a low speed, as shown by the curve 81 in FIG. 6, so that the speed change unit increases the engine revolution at a rate higher than the engine would do by its own power. Such a relation between the car speed and the engine revolution is analogous to the situation where an engine brake is applied, and the vehicle under this situation temporarily decelerates rather than accelerating as the driver expects it to do.

When the driver releases the accelerator pedal to activate the engine brake, what he or she normally expects is that because the complete resetting of the accelerator pedal, with the transmission ratio set for relatively high speed, tends to drop the engine revolution sharply and because the inertial motion of the car tends to keep the engine running at high revolution, the sudden drop of engine revolution becomes a load on the car inertia, putting the car under the same condition that a brake is applied, with the result that the car speed will gradually decrease and the transmission ratio correspondingly shifts to the one appropriate for a relatively low speed.

However, because of the above-mentioned characteristic of the toroidal continuous variable transmission that the speed shift is quickly accomplished and because of the setting such that the amount of change in the target transmission ratio is large for a change in the accelerator opening, the complete resetting of the accelerator pedal causes the rotation radius ratio of the actual contact points in the toroidal speed change unit to quickly shift to a target transmission ratio compatible to a low speed lower than a transmission ratio for which the engine brake can be expected. Because the engine has a higher revolution than is expected when the car with that transmission ratio is traveling normally at the current car speed, the engine has an excess power, which in turn results in the car accelerating temporarily rather than decelerating as the driver expects it to do.

With the conventional toroidal continuous variable transmission, as described above, the engine revolution varies more than necessary in response to the operation of accelerator pedal. Therefore, when the engine of the vehicle is a diesel engine, the pressure in the engine cylinder becomes unstable, degrading the contents of emissions with increased smoke.

To solve the above problem, the conventional toroidal continuous variable transmission is known to set a map, which is stored in the controller, in such a way as to reduce the amount of change in the target transmission ratio that corresponds to a change in the accelerator opening. With this method, however, it is not possible to meet an essential requirement of driving the engine in the optimum condition and also utilizing an excellent speed-change characteristic of the toroidal continuous variable transmission. As described above, although the toroidal continuous variable transmission has an excellent speed-change responsiveness, this fast responsiveness can become a disadvantage when the shift of the transmission ratio is too quick causing an excessively large change in the target transmission ratio.

SUMMARY OF THE INVENTION

The objective of this invention is to solve the above-mentioned problem. That is, it is an object of this invention to provide a toroidal continuous variable transmission which, when the amount of change of the target transmission ratio is large, prevents the rate—at which the transmission ratio in the toroidal speed change unit is changed—from becoming too great and at the same time takes advantage of excellent speed change responsiveness, thereby performing acceleration and deceleration in a manner that the driver expects the car to do and, in the case of an diesel engine, preventing generation of smoke and HC emissions in the exhaust gas.

This invention relates to a toroidal continuous variable transmission comprising: input disks to which a torque of an engine is transmitted through loading cams; output disks arranged opposite the input disks; an output shaft coupled to the output disks; tilt-rotatable power rollers arranged between the input disks and the output disks to continuously change a transmission ratio according to changes of tilt angles in transmitting the torque from the input disks to the output disks; actuators to change the tilt angles of the power rollers; and a controller for the actuators to obtain a target transmisson ratio determined on car speed-related informations, said target transmisson ratio being obtained by limiting the amount of change pep unit time of the transmission ratio within a predetermined value.

Because the toroidal continuous variable transmission limits to within a predetermined value the amount of change per unit time of the target transmission ratio, which is set based on car speed-related information such as accelerator opening, the set target transmission ratio, if the amount of change of the target transmission ratio is less than the predetermined value, is adopted as is and the power rollers are tilt-rotated between the input and output disks by driving the actuator in the toroidal speed change unit according to the command from the controller so that the actual transmission ratio agrees with the target transmission ratio. In this case, the toroidal continuous variable transmission can fully deliver the excellent speed change responsiveness of the toroidal speed change unit.

When the amount of change of the target transmission ratio, which is set according to the car speed-related information such as accelerator opening, is greater than the predetermined value, the controller corrects the amount of change of the target transmission ratio—for which a corresponding control output is determined according to the map—and then limits it to the predetermined value. And in the toroidal speed change unit the actuators tilt-rotate the power rollers between the input disks and the output disks until the corrected target transmission ratio is reached. This process prevents the transmission ratio from changing by a large amount in a short time due to quick responsiveness, thus stabilizing the control of transmission ratio during the acceleration and deceleration of a vehicle.

In this toroidal continuous variable transmission, when the amount of change of the target transmission ratio is smaller than the predetermined value, the power rollers are tilt-rotated so that the actual transmission ratio will agree with the uncorrected target transmission ratio that was adopted as it was. As a result, the excellent speed change responsiveness of the toroidal continuous variable transmission can be utilized while operating the engine in an optimum condition.

When the amount of change of the target transmission ratio is greater than the predetermined value, it is limited to the predetermined value, thus moderating the rapid change of transmission ratio that the transmission unit would otherwise have attempted to accomplish. This in turn stabilizes the control of the transmission ratio during the acceleration and deceleration of the vehicle. As a result, the engine revolution is prevented from changing more than necessary in response to the operation of accelerator pedal. The driver therefore will feel that there is a good compatibility between the car speed change and the accelerator pedal operation and can get what he expects in terms of acceleration and deceleration. In the case of a diesel engine, the above operation procedure stabilizes the pressure in the engine cylinders and therefore reduces smoke and HC emissions in the exhaust gases.

DETAILED DESCRIPTION OF THE PREFERRED EMBODIMENTS

Figure 1:
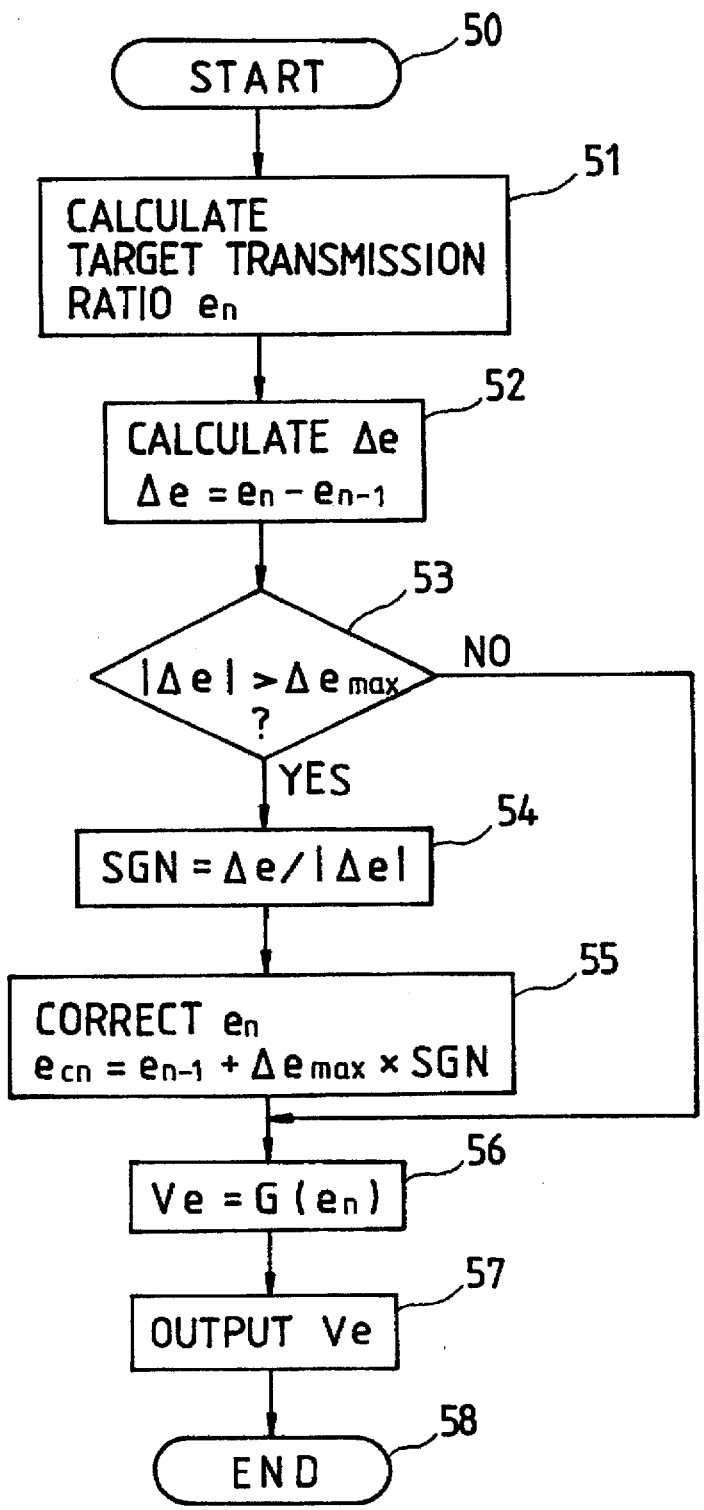
FIG. 1 is a process flow diagram showing an example control performed by the toroidal continuous variable transmission of this invention.
Figure 2:
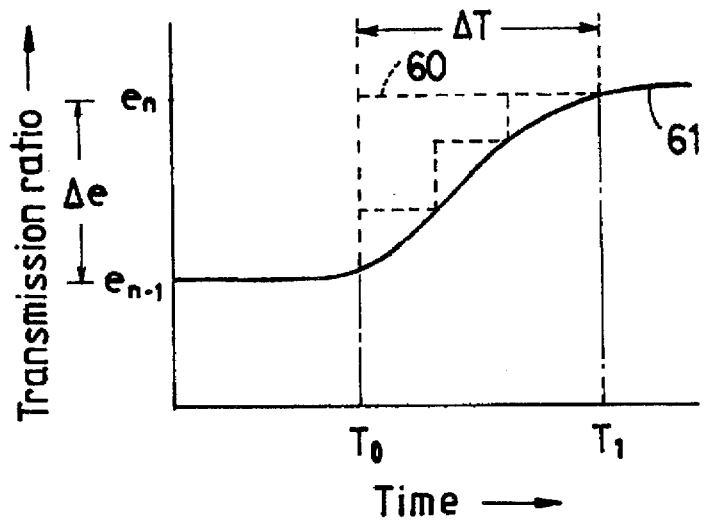
FIG. 2 is a graph showing a change with time of the transmission ratio controlled by the toroidal continuous variable transmission of this invention.

One embodiment of the toroidal continuous variable transmission of this invention is described by referring to the accompanying drawings. This embodiment uses the construction of FIG. 3 and 4 for the toroidal speed change unit of the toroidal continuous variable transmission, and the reference numerals in these figures are used in the following descriptions.

Figure 3:
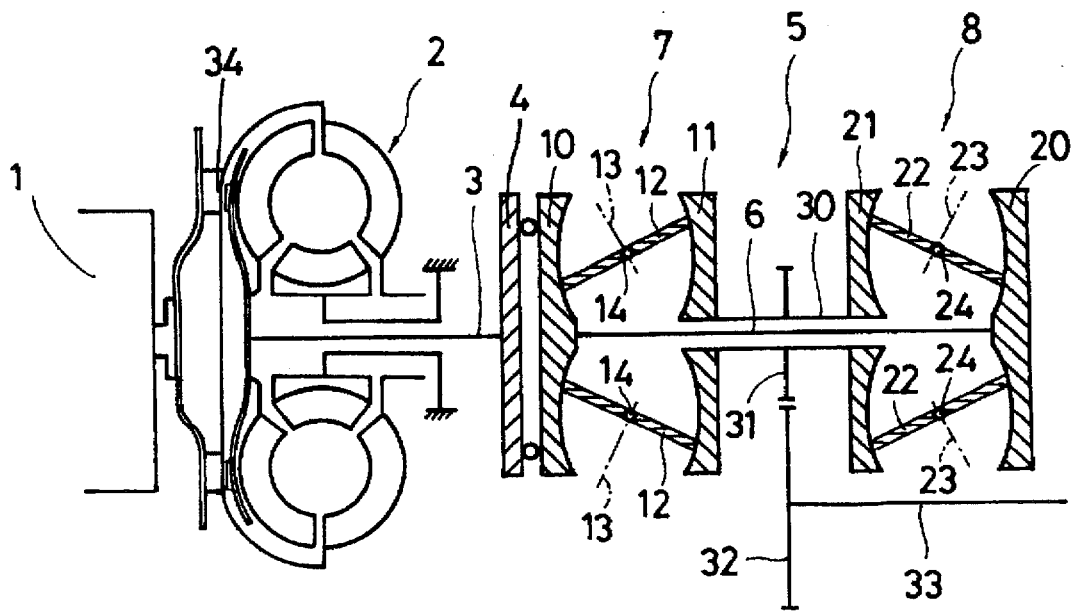
FIG. 3 is a schematic cross section showing the construction of the toroidal continuous variable transmission.
Figure 4:
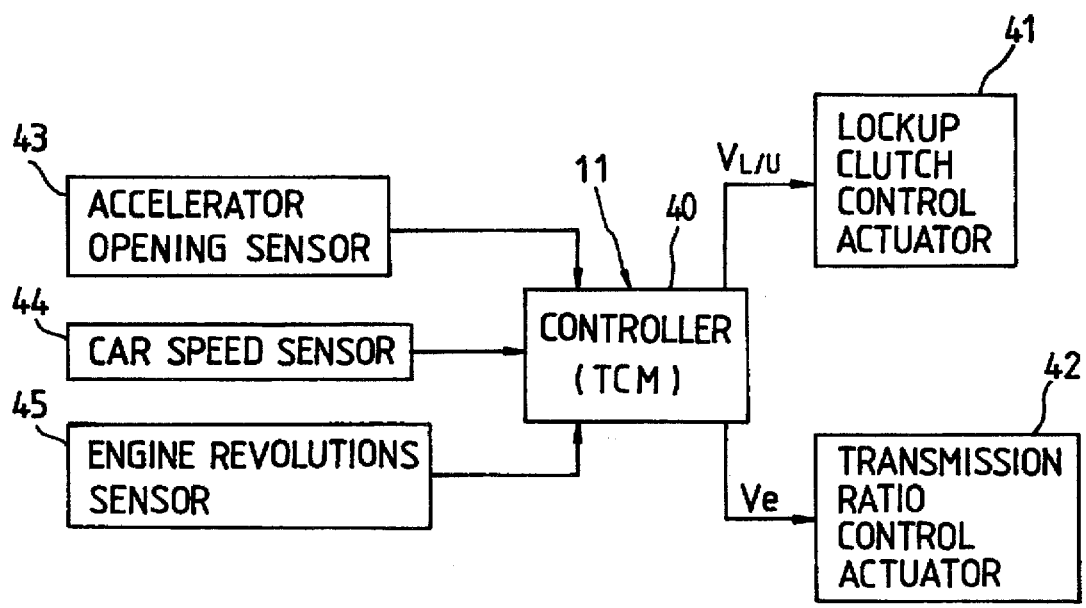
FIG. 4 is a block diagram showing the control system for the toroidal continuous variable transmission.
Figure 5:
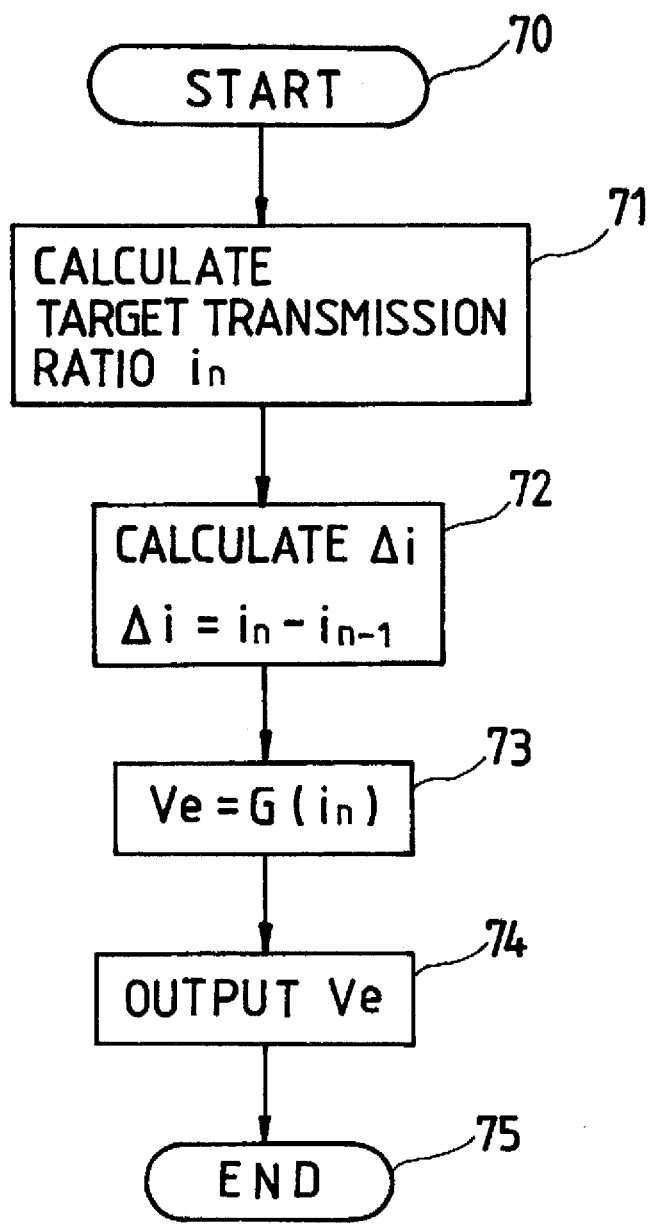
FIG. 5 is a process flow diagram showing an example control performed by a conventional toroidal continuous variable transmission.

The control operation of the toroidal continuous variable transmission is explained by referring to FIG. 1, 3 and 4. First, the control operation of the toroidal continuous variable transmission 5 is started (step 50). A controller 40 calculates a target transmission ratio $e_n$ based on the information, such as car speed, engine revolution and throttle opening, obtained by the main routine (step 51). Next, the controller 40 calculates a difference $\Delta e$ (=$e_n-e_{n-1}$) between the present target transmission ratio $e_n$ and the previously calculated target transmission ratio $e_{n-1}$ (step 52). Then, it is checked whether the absolute value of the transmission ratio difference $\Delta e$ is greater than a predetermined maximum value $\Delta e_{max}$ (step 53).

When the absolute value of the transmission ratio difference $\Delta e$ is smaller than the predetermined maximum value $\Delta e_{max}$, the calculated target transmission ratio $e_n$ is used as it is to calculate a control signal Ve for the target transmission ratio $e_n$ according to a map stored beforehand in the controller 40 (step 56). The calculated control signal Ve is output to a transmission ratio control actuator 42 (step 57). In response to the control signal Ve received, the transmission ratio control actuator 42 changes the tilt angles of the power rollers 12, 22 of the toroidal speed change units 7, 8 to make the actual transmission ratio match the target transmission ratio. Then, the control processing of the controller 40 returns to the main routine (step 58). In this way, when the amount of change in the target transmission ratio is small, the excellent speed change responsiveness of the toroidal speed change units 7, 8 can be fully utilized.

When the absolute value of the transmission ratio difference $\Delta e$ is greater than the predetermined maximum value $\Delta e_{max}$, a sign SGN of $\Delta e$, represented by 1 or $-1$, is determined by dividing $\Delta e$ by the absolute value of $\Delta e$ (step 54). The present target transmission ratio value $e_n$ is corrected by using the sign SGN and $\Delta e_{max}$ (step 55). That is, the product of the predetermined maximum value $\Delta e_{max}$ and the sign SGN is added to the previously calculated target transmission ratio $e_{n-1}$ to get a corrected target transmission ratio $e_{cn}$ for the present target transmission ratio $e_n$. Hence, the amount of change (absolute value) from the previously calculated target transmission ratio $e_{n-1}$ to the corrected target transmission ratio $e_{cn}$ is smaller than the amount of change (absolute value) for the present target transmission ratio $e_n$. In other words, the corrected target transmission ratio reduces the amount of change of the target transmission ratio.

For the corrected target transmission ratio $e_{cn}$, a control signal Ve is calculated according to the map stored in the controller 40 (step 56). The calculated control signal Ve is output to the transmission ratio control actuator 42 (step 57). The transmission ratio control actuator 42, based on the control signal, changes the tilt angles of the power rollers 12, 22 of the toroidal speed change units 7, 8 to make the actual transmission ratio agree with the corrected target transmission ratio $e_{cn}$. The rate of shift of the transmission ratio is slower for the corrected target transmission ratio than for the target transmission ratio $e_n$ which is not yet corrected. Then the control flow moves to step 58, from which it returns to the main routine again. As described above, when the amount of change of the target transmission ratio is large, this control procedure prevents the excellent responsiveness of the toroidal speed change unit from becoming too fast and unstable.

Figure 6:
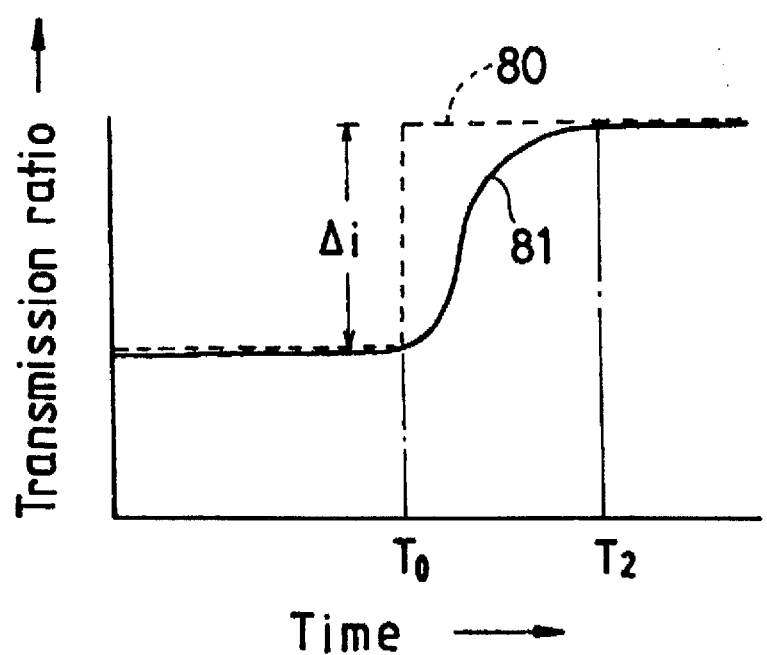
FIG. 6 is a graph showing a change with time of the transmission ratio controlled by the conventional toroidal continuous variable transmission.

Now, we will explain about the change over time of the target transmission ratio and the actual transmission ratio in the toroidal continuous variable transmission 5 when a driver performs an accelerator operation to cause quick acceleration, such as a kickdown. Suppose that the driver kicked down at time $T_O$ and that the amount of change $\Delta e_{n-1}$ from the previous target transmission ratio $e_{n-1}$ to the present target transmission ratio $e_n$ at this moment is greater than a predetermined maximum value $\Delta e_{max}$, as shown by a dashed line 60. At time $T_0$, the target transmission ratio is corrected to the $e_{cn0}=e_{n-1}+\Delta e_{max}$. Because the corrected target transmission ratio is smaller than the uncorrected one, the rate at which the actual transmission ratio changes is relatively moderate. At the next timing of calculating the target transmission ratio, too, if the amount of change of the target transmission ratio $\Delta e_n$ is larger than the predetermined maximum value $\Delta e_{max}$, the target transmission ratio is corrected to $e_{cn1}=e_{n0}+\Delta e_{max}$, making the rate of change of the transmission ratio thereafter relatively moderate. At the next timing of calculating the target transmission ratio, if the amount of change of the target transmission ratio $\Delta e_{n+1}$ is smaller than the predetermined maximum value $\Delta e_{max}$, the target transmission ratio is corrected to $e_{cn2}=e_{cn1}+\Delta e_{n+1}$. The time $T_1$ taken by the actual transmission ratio to reach the final target transmission ratio is, as represented by a curve 61, longer than the time $T_2$ required by the conventional toroidal continuous variable transmission (see FIG. 6). That is, the shift time is set sufficiently longer than in the conventional toroidal continuous variable transmission to allow the shift to be performed at a more moderate rate.

What is claimed is:

1. A toroidal continuous variable transmission comprising:

input disks to which a torque of an engine is transmitted through loading cams;

output disks arranged opposite the input disks;

an output shaft coupled to the output disks;

tilt-rotatable power rollers arranged between the input disks and the output disks to continuously change a transmission ratio according to changes of tilt angles in transmitting the torque from the input disks to the output disks;

actuators to change the tilt angles of the power rollers; and a controller for the actuators to obtain a target transmission ratio determined on car speed-related informations, said target transmission ratio being obtained by limiting the amount of change per unit time of the transmission ratio within a predetermined value.

* * * * *